United States Patent
Fujita

(10) Patent No.: US 9,942,930 B2
(45) Date of Patent: Apr. 10, 2018

(54) COMMUNICATION APPARATUS, CONTROL METHOD THEREOF, AND PROGRAM

(71) Applicant: CANON KABUSHIKI KAISHA, Tokyo (JP)

(72) Inventor: Shunji Fujita, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/769,418

(22) PCT Filed: Feb. 14, 2014

(86) PCT No.: PCT/JP2014/000769
§ 371 (c)(1),
(2) Date: Aug. 20, 2015

(87) PCT Pub. No.: WO2014/129157
PCT Pub. Date: Aug. 28, 2014

(65) Prior Publication Data
US 2016/0007397 A1    Jan. 7, 2016

(30) Foreign Application Priority Data
Feb. 22, 2013  (JP) ................................ 2013-033508

(51) Int. Cl.
*H04W 76/02* (2009.01)
*H04W 60/00* (2009.01)
(Continued)

(52) U.S. Cl.
CPC ........... *H04W 76/023* (2013.01); *H04L 67/06* (2013.01); *H04L 67/16* (2013.01); *H04L 67/32* (2013.01);
(Continued)

(58) Field of Classification Search
USPC .................................................. 455/41.2, 68
See application file for complete search history.

(56) References Cited

U.S. PATENT DOCUMENTS 5,889,943 A * 3/1999 Ji ........................ G06F 21/564
713/188
7,613,426 B2  11/2009 Kuehnel et al.
(Continued)

FOREIGN PATENT DOCUMENTS

CA  2822802 A1  6/2012
CN  101341686 A  1/2009
(Continued)

OTHER PUBLICATIONS

IEEE Std 802.11u™ 2011, IEEE Standard for Information Technology—Telecommunications and Information Exchange Between Systems—Local and Metropolitan Area Networks—Specific requirements, Part 11, Amendment 9, Feb. 25, 2011, pp. i-xvi, 1-190, The Institute of Electrical and Electronics Engineers, Inc., New York, NY, 2011.

*Primary Examiner* — Nay A Maung
*Assistant Examiner* — Erica Fleming-Hall
(74) *Attorney, Agent, or Firm* — Canon U.S.A., Inc. IP Division

(57) ABSTRACT

A communication apparatus capable of transmitting data to an external device transmits transmission data-related information relating to data to be transmitted to the external device before joining a wireless network, receives a response from the external device after the transmission data-related information has been transmitted, joins a wireless network after the response has been received, and, after joining a wireless network, establishes communication with the external device so that data can be transmitted, and first information is transmitted as the transmission data-related information before the transmission data to be transmitted to the external device is determined.

13 Claims, 9 Drawing Sheets

(51) Int. Cl.
  *H04W 80/00* (2009.01)
  *H04L 29/08* (2006.01)
  *H04W 4/20* (2018.01)
  *H04W 84/12* (2009.01)
  *H04W 84/18* (2009.01)

(52) U.S. Cl.
  CPC ............ *H04W 4/20* (2013.01); *H04W 80/00* (2013.01); *H04W 84/12* (2013.01); *H04W 84/18* (2013.01)

(56) References Cited

U.S. PATENT DOCUMENTS

| | | | |
|---|---|---|---|
| 7,627,899 B1 * | 12/2009 | Tripathi | H04L 63/1458 726/25 |
| 7,925,244 B2 * | 4/2011 | Minor | H04L 67/06 455/41.2 |
| 7,995,484 B2 * | 8/2011 | Miyoshi | G06F 13/387 370/242 |
| 8,122,162 B2 | 2/2012 | Kweon et al. | |
| 8,635,284 B1 * | 1/2014 | Tripathi | H04L 49/9047 709/206 |
| 2005/0110654 A1 | 5/2005 | Kitano | |
| 2006/0044599 A1 * | 3/2006 | Lipowitz | G06Q 30/0641 358/1.15 |
| 2007/0141984 A1 * | 6/2007 | Kuehnel | H04W 4/00 455/41.2 |
| 2007/0177822 A1 * | 8/2007 | Uno | H04N 1/00204 382/305 |
| 2009/0002730 A1 | 1/2009 | Yamada et al. | |
| 2009/0066998 A1 | 3/2009 | Kato | |
| 2009/0069998 A1 | 3/2009 | Mehrer et al. | |
| 2009/0180425 A1 | 7/2009 | Watanabe | |
| 2009/0201377 A1 * | 8/2009 | Okano | H04N 1/00347 348/207.1 |
| 2011/0131631 A1 | 6/2011 | Ihori et al. | |
| 2011/0132174 A1 | 6/2011 | Shishido | |
| 2012/0203850 A1 * | 8/2012 | Luo | H04L 51/08 709/206 |
| 2013/0040576 A1 | 2/2013 | Yoon | |
| 2013/0094047 A1 * | 4/2013 | Bailey | H04L 63/18 358/1.14 |
| 2016/0088507 A1 * | 3/2016 | Gao | H04W 36/0083 370/252 |

FOREIGN PATENT DOCUMENTS

| | | |
|---|---|---|
| CN | 102082588 A | 6/2011 |
| CN | 102860092 A | 1/2013 |
| EP | 2555490 A2 | 2/2013 |
| JP | 2002-223466 A | 8/2002 |
| JP | 2005159696 A | 6/2005 |
| JP | 2009521191 A | 5/2009 |
| JP | 2009-152689 A | 7/2009 |
| JP | 2009-170971 A | 7/2009 |
| JP | 2010-157977 A | 7/2010 |
| JP | 2011-114708 A | 6/2011 |
| JP | 2013-005120 A | 1/2013 |
| RU | 2432708 C2 | 10/2011 |
| RU | 2011130379 A | 1/2013 |
| RU | 2476029 C2 | 2/2013 |
| WO | 2006/080468 A1 | 8/2006 |
| WO | 2011/132174 A1 | 10/2011 |
| WO | 2012/111255 A1 | 8/2012 |
| WO | 2012/115385 A2 | 8/2012 |
| WO | 2012/173423 A2 | 12/2012 |

* cited by examiner

[Fig. 1]
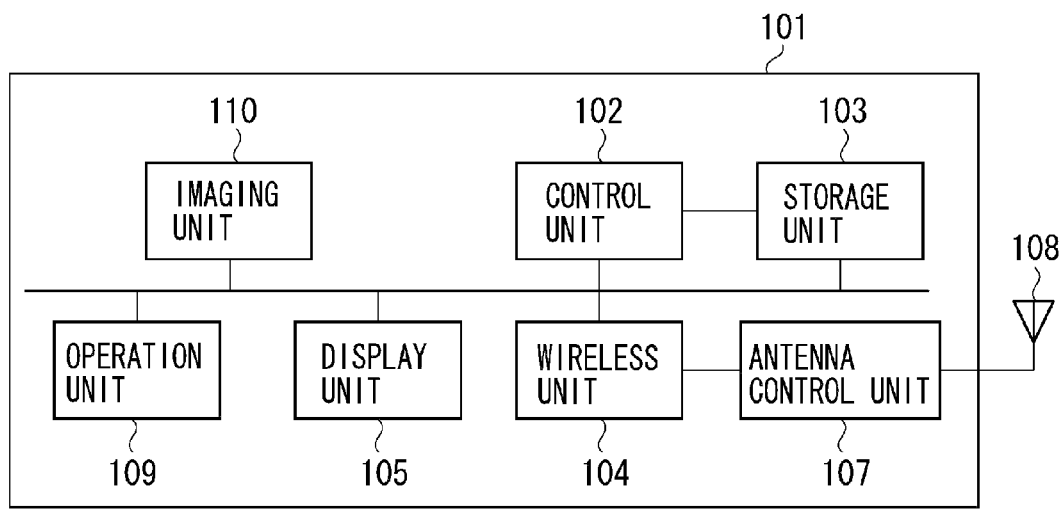

[Fig. 2]
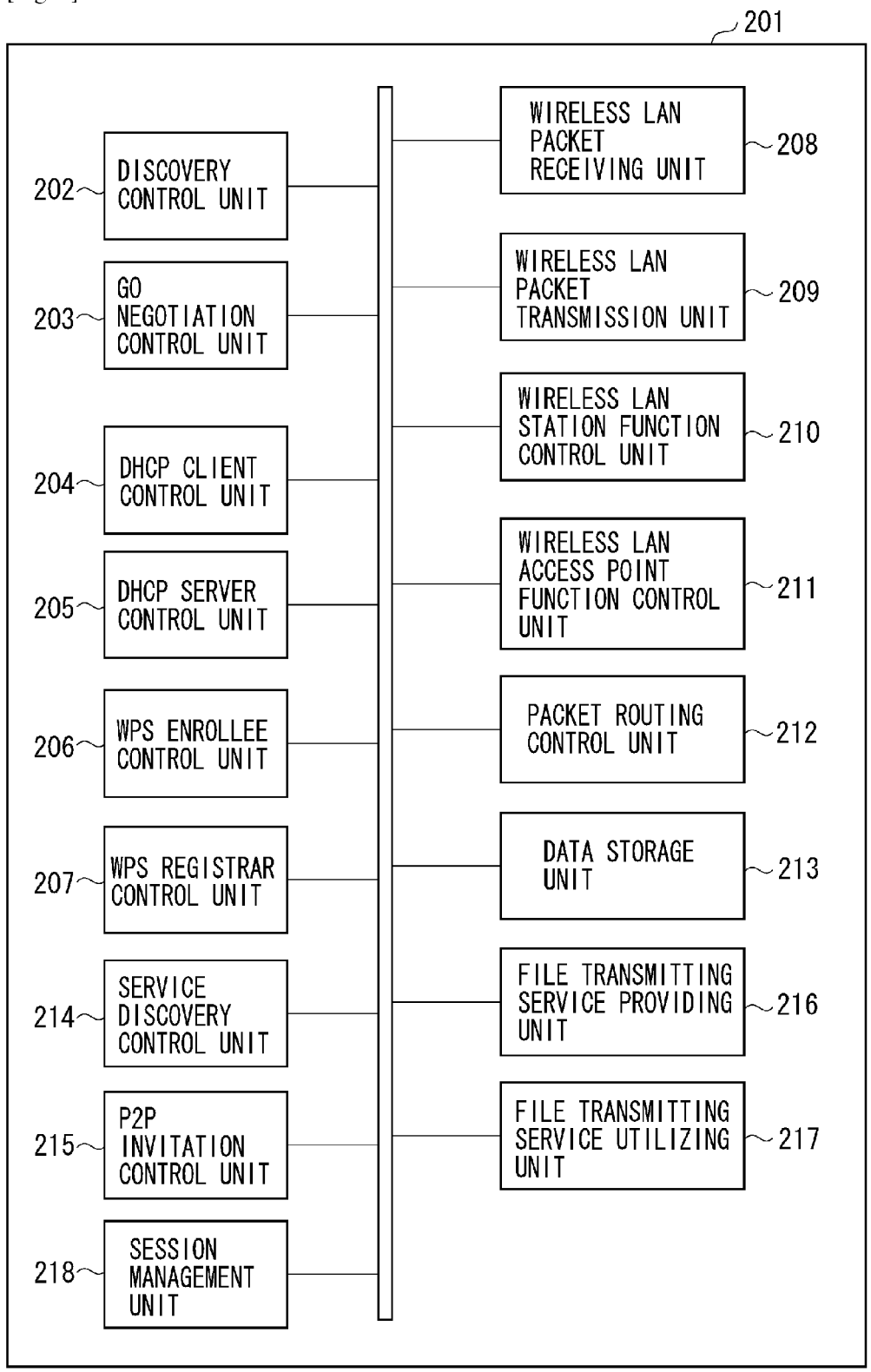

[Fig. 3]
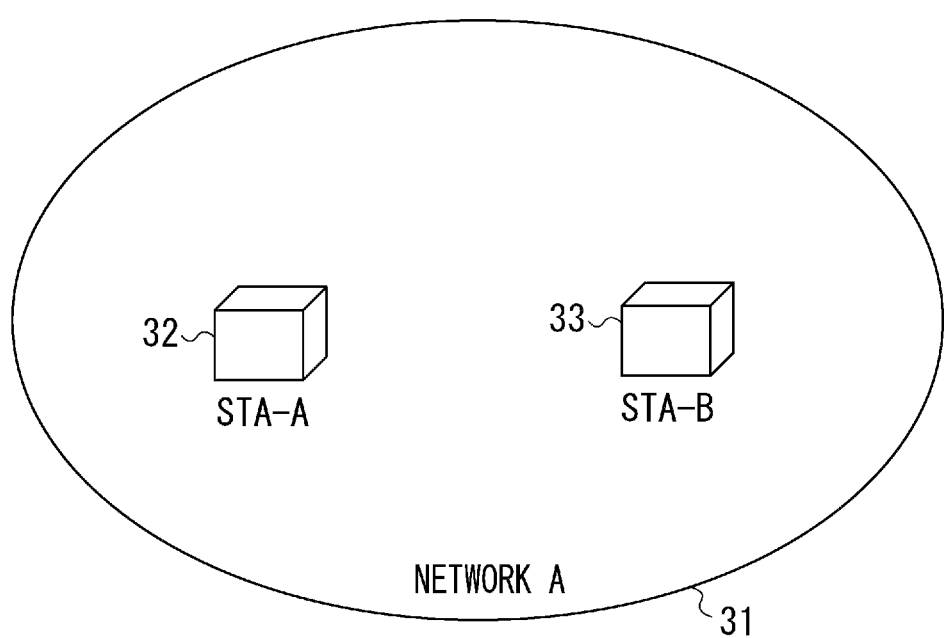

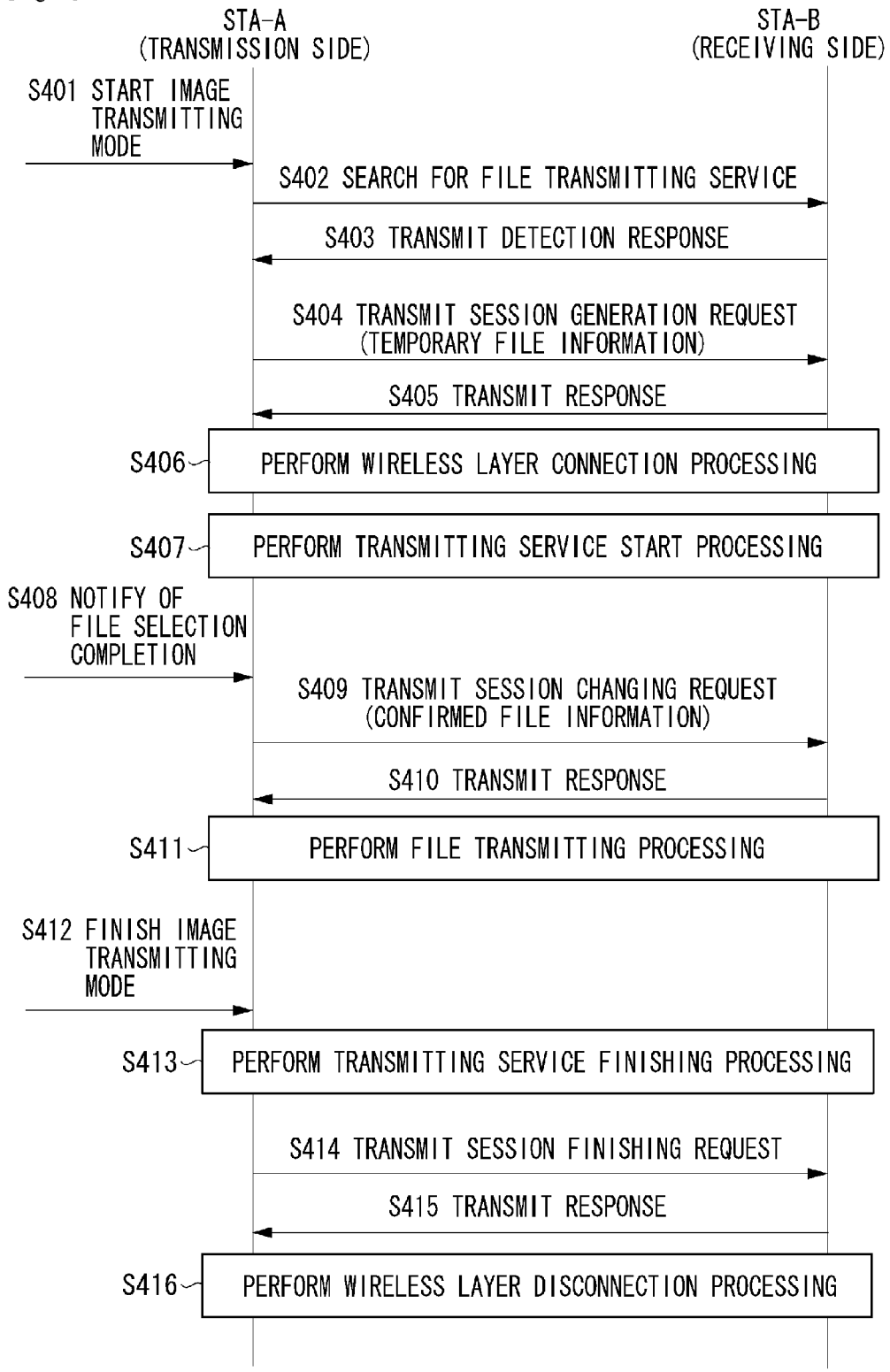

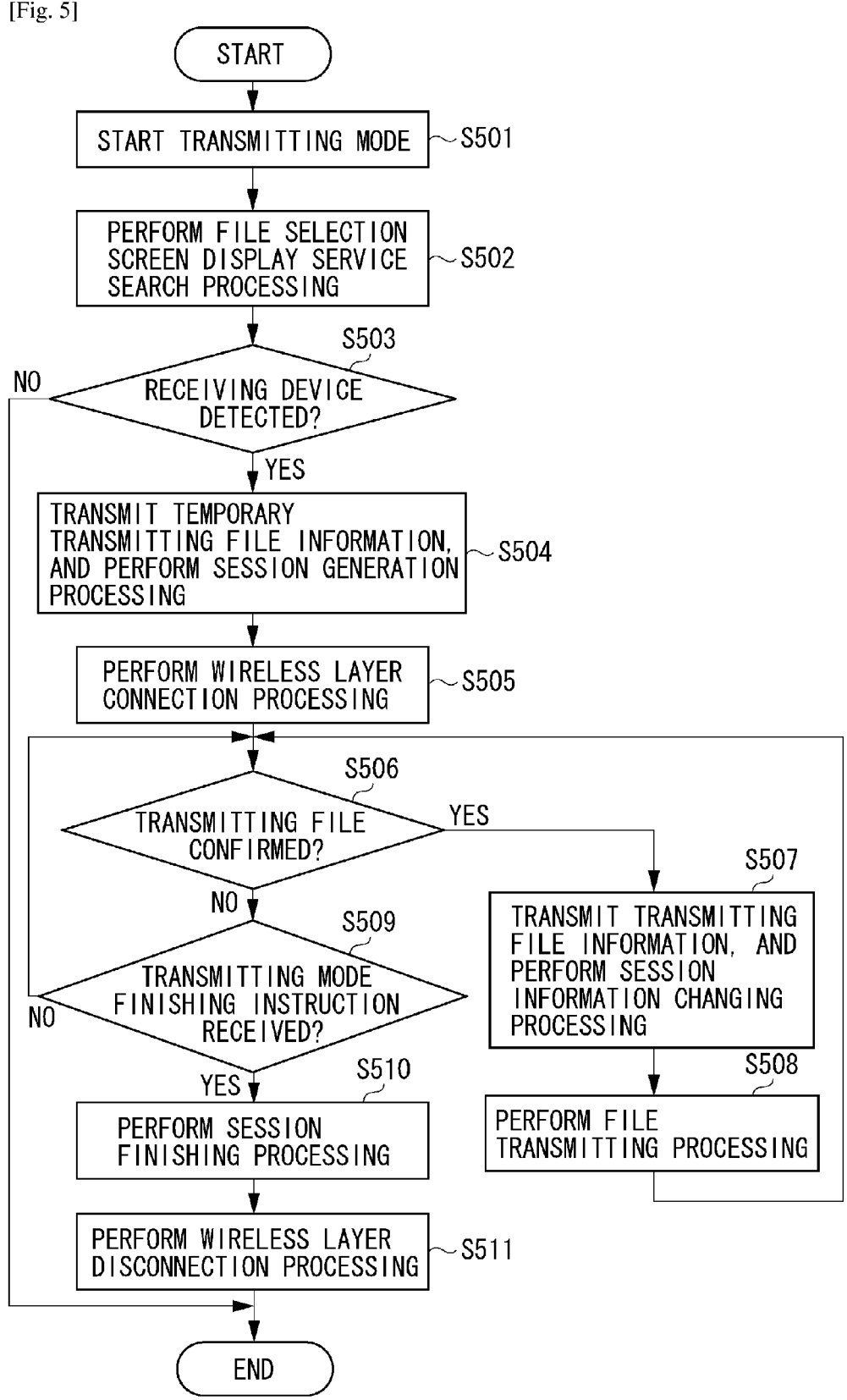
[Fig. 5]

[Fig. 6A]
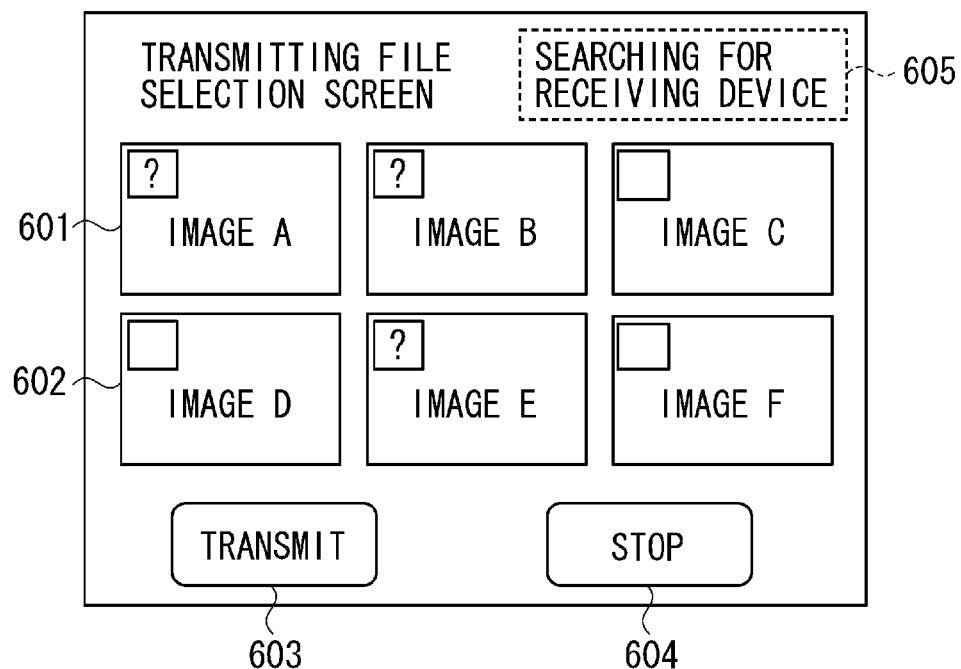
[Fig. 6B]
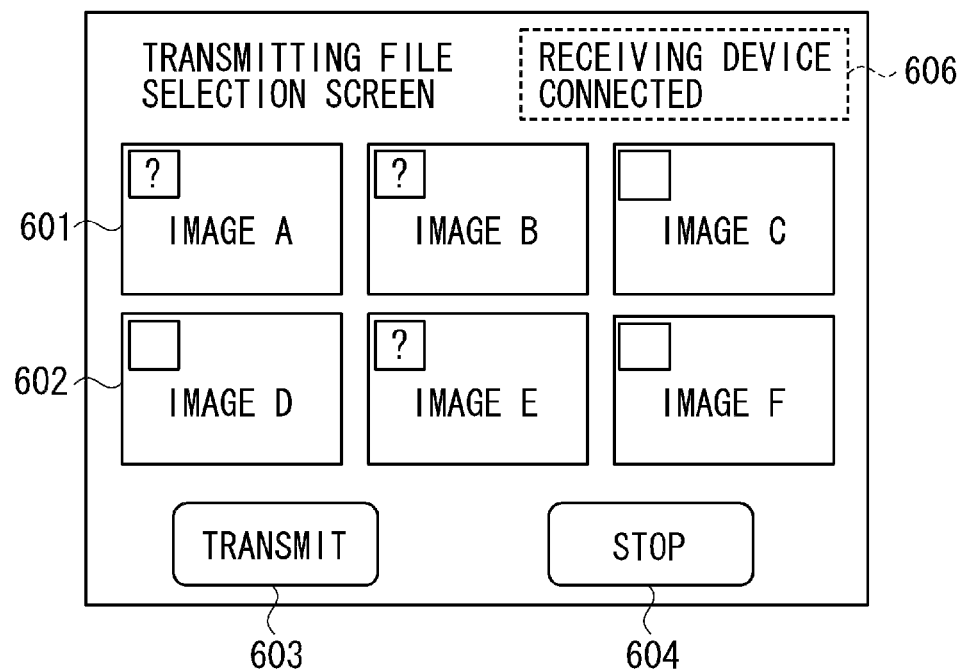

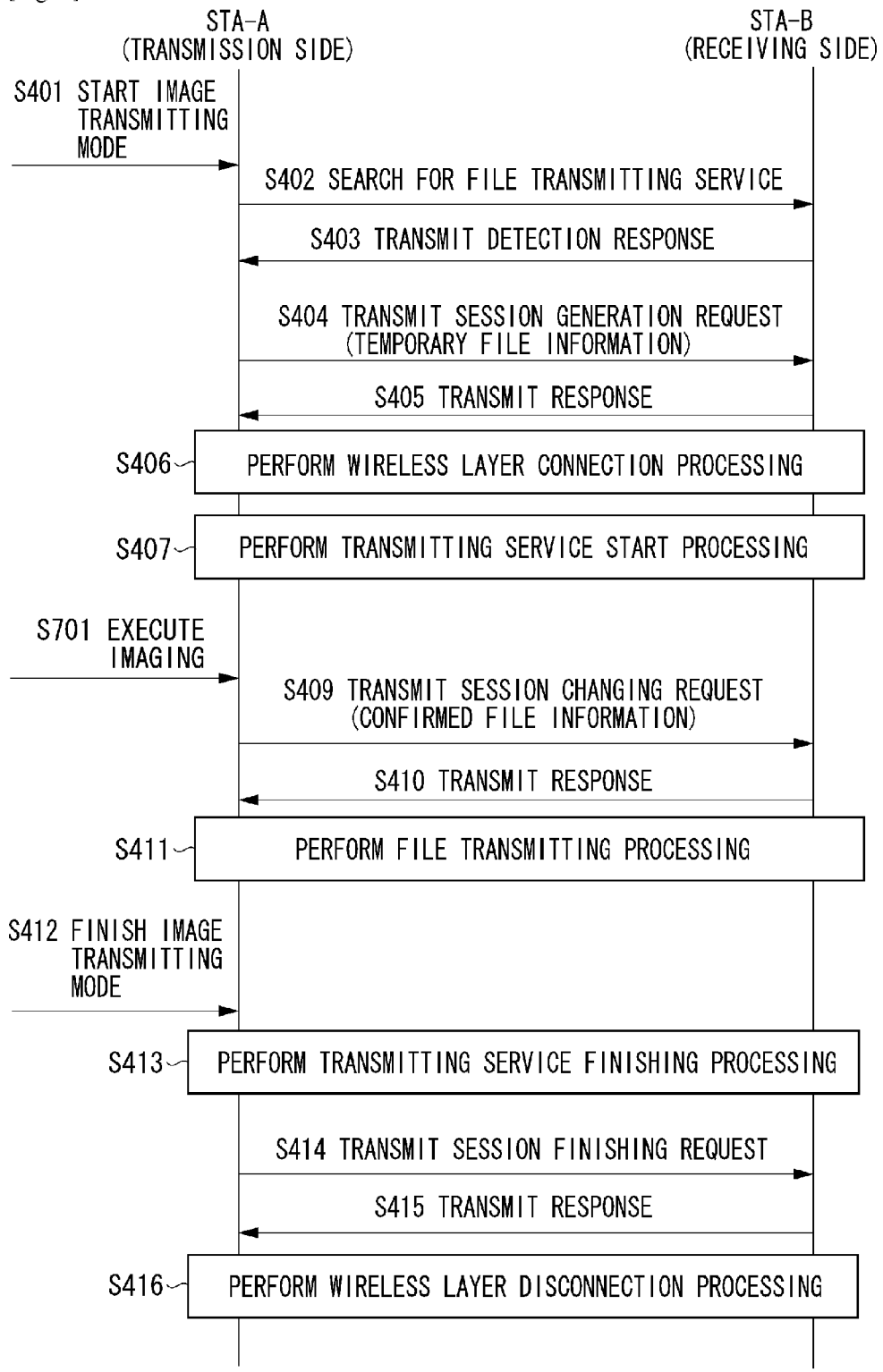

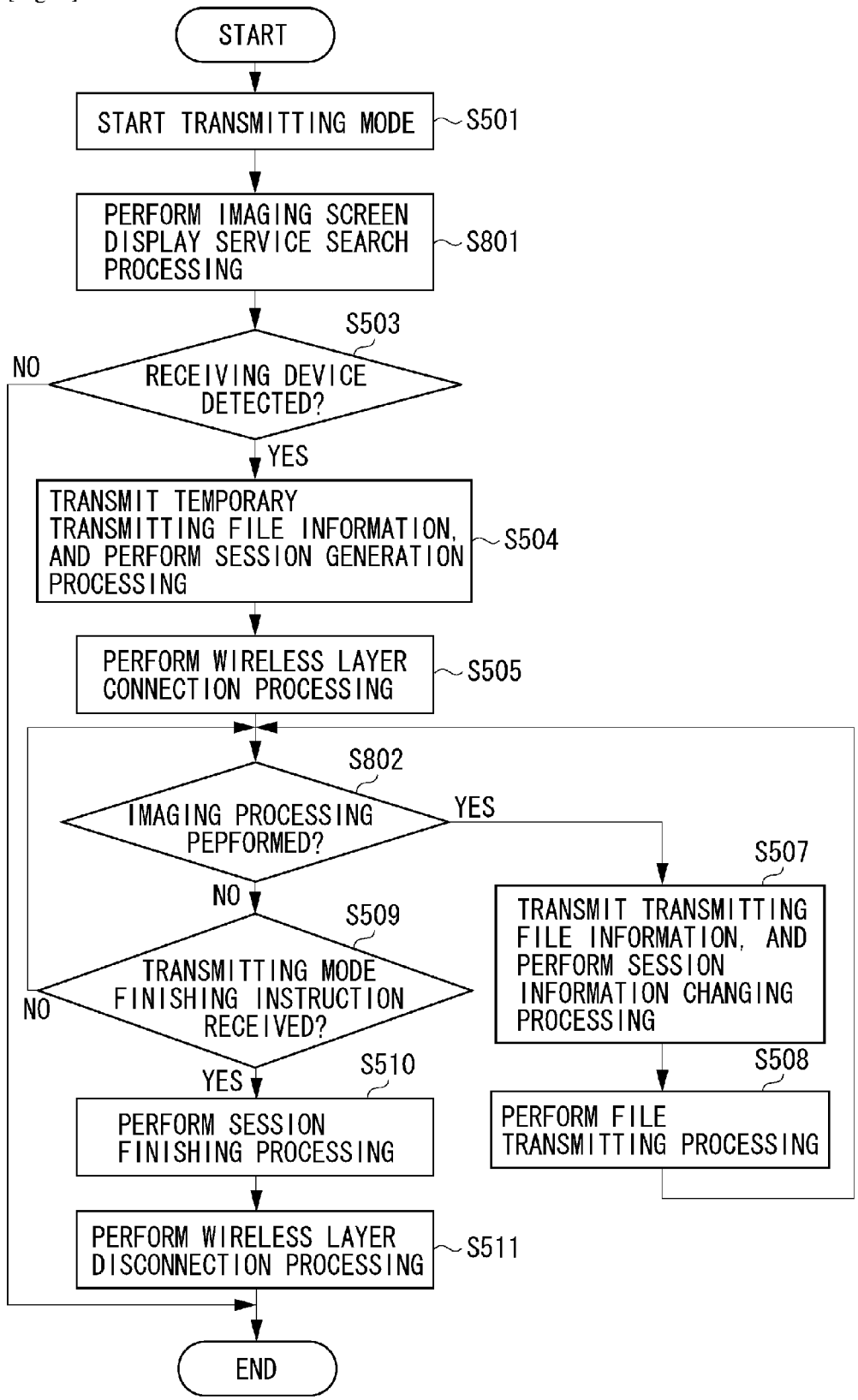

[Fig. 9]
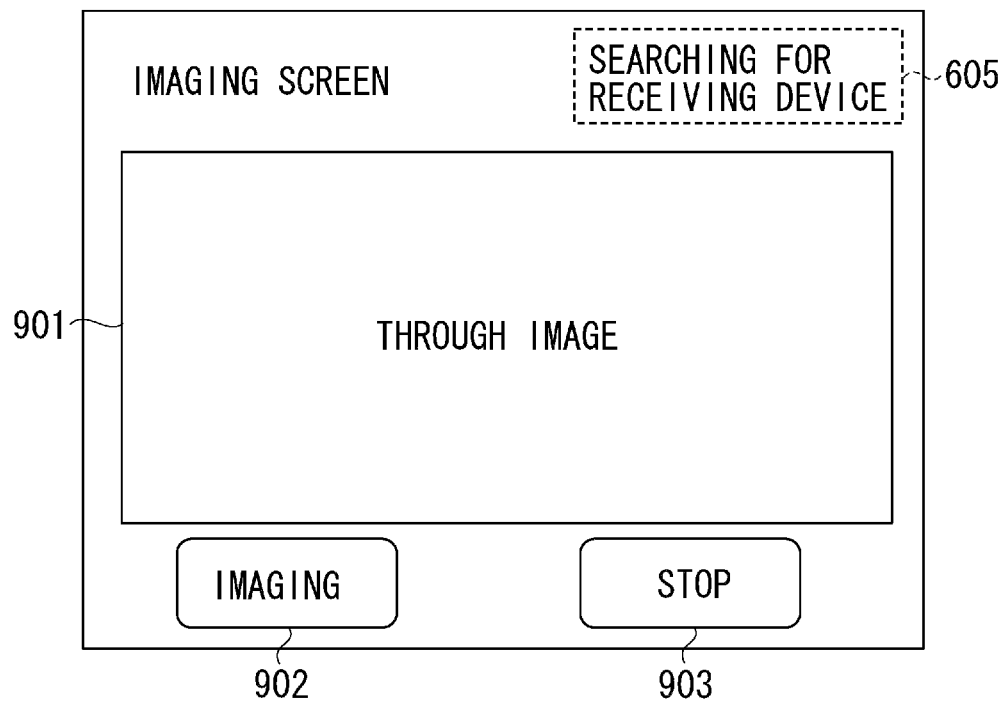

COMMUNICATION APPARATUS, CONTROL METHOD THEREOF, AND PROGRAM

TECHNICAL FIELD

The present invention relates to a communication apparatus capable of communicating with an external device.

BACKGROUND ART

With the spread of wireless communication, an image file can now be transmitted by mounting a wireless communication function even on a portable terminal, such as a digital camera (PTL 1). For example, when performing data communication using a wireless local area network (LAN), such a method as first joining a wireless LAN network and then establishing communication with an external device on the network may be employed.

CITATION LIST

Patent Literature

PTL 1: Japanese Patent Application Laid-Open No. 2009-152689

SUMMARY OF INVENTION

Technical Problem

However, after a connection based on a wireless layer and communication with an external device have been established, if it is determined that the transmission and reception of data with the external device cannot be performed properly, the connection processing performed up to that point is wasted. Therefore, there is a need to properly perform the processing for establishing communication and the processing for specifying the data to be transmitted and received.

Solution to Problem

According to an aspect of the present invention, a communication apparatus capable of transmitting data to an external device, includes a transmitting unit configured to transmit transmission data-related information relating to data to be transmitted to the external device before joining a wireless network, a receiving unit configured to receive a response from the external device after the transmission data-related information has been transmitted by the transmitting unit, a network joining unit configured to, after the response has been received by the receiving unit, join a wireless network, and a communication unit configured to, after the joining unit has joined a wireless network, establish communication with the external device so that data can be transmitted, wherein the transmitting unit is configured to transmit first information as the transmission data-related information before the transmission data to be transmitted to the external device is determined.

Advantageous Effects of Invention

According to the present invention, processing for establishing communication and processing for specifying data to be transmitted and received can be properly performed.

BRIEF DESCRIPTION OF DRAWINGS

FIG. 1 illustrates hardware function blocks of a communication apparatus.

FIG. 2 illustrates software function blocks of a communication apparatus.

FIG. 3 illustrates an example of a network configuration in which the present invention is applied.

FIG. 4 is a sequence diagram between communication apparatuses according to a first exemplary embodiment.

FIG. 5 is a flowchart illustrating operation of a communication apparatus according to the first exemplary embodiment.

FIG. 6A illustrates an example of a GUI screen of a communication apparatus according to the first exemplary embodiment.

FIG. 6B illustrates an example of a GUI screen of a communication apparatus according to the first exemplary embodiment.

FIG. 7 is a sequence diagram between communication apparatuses according to a second exemplary embodiment.

FIG. 8 is a flowchart illustrating operation of a communication apparatus according to the second exemplary embodiment.

FIG. 9 illustrates an example of a GUI screen of a communication apparatus according to the second exemplary embodiment.

DESCRIPTION OF EMBODIMENTS

A communication apparatus according to a first exemplary embodiment will now be described with reference to the drawings. Although the following description will be made using a wireless LAN system based on the Institute of Electrical and Electronics Engineers (IEEE) 802.11 series as an example, the communication mode is not limited to a wireless LAN system based on IEEE 802.11.

An example of the hardware configuration according to the present exemplary embodiment will now be described.

FIG. 1 is a block diagram illustrating an example of the configuration of the respective apparatuses that are described below according to an exemplary embodiment to which the present invention can be applied.

FIG. 1 illustrates a block configuration of a communication apparatus 101.

A control unit 102 controls the overall apparatus by executing a control program stored in a storage unit 103. The control unit 102 includes one or a plurality of processors, such as a central processing unit (CPU) or a micro-processing unit (MPU). The control unit 102 also controls the setting of a communication parameter between this apparatus and another apparatus.

The storage unit 103 stores the control program executed by the control unit 102 and various kinds of information, such as a communication parameter. Further, image data and files generated by the communication apparatus or received from an external device may also be stored in the storage unit 103. The storage unit 103 may be configured from various types of memories, such as a read-only memory (ROM), a random-access memory (RAM), a hard disk drive (HDD), and a flash memory. Each of the operations that are described below is performed by the control unit 102 executing a control program stored in the storage unit 103.

A wireless unit 104 performs wireless LAN communication based on the IEEE 802.11 series.

A display unit 105 for presenting various displays has a function of outputting visually perceivable information like a liquid crystal display (LCD) or a light-emitting diode (LED), or a function capable of outputting sound like a speaker. The display unit 105 includes at least either the function of outputting visual information or sound information.

An antenna control unit 107 transmits and receives signals by wireless communication by controlling an antenna 108.

An operation unit 109 is used by the user to perform various inputs for operating the communication apparatus. The operation unit 109 is configured from various buttons, a touch panel, and the like.

An imaging unit 110, which includes an optical lens, a complementary metal oxide semiconductor (CMOS) sensor, a digital image processing unit, and the like, generates image data by converting an analog signal input via the optical lens into digital data. The image data generated by the imaging unit 110 is stored in the storage unit 103.

Note that FIG. 1 is merely an example, and the communication apparatus 101 may include hardware units other than the hardware units illustrated in FIG. 1.

FIG. 2 is a block diagram illustrating an example of a configuration of the software function blocks executing the below-described communication control functions.

FIG. 2 illustrates a block configuration of a software function block 201.

A Discovery control unit 202 operates search processing for searching for a communication apparatus that will be a communication counterparty.

A GO Negotiation control unit 203 performs control based on a Wi-Fi Direct protocol specification to determine the roles to be performed in a wireless layer, such as which communication apparatus will serve as an access point and which communication apparatus will serve as a wireless LAN station. In Wi-Fi Direct, the communication apparatus performing the wireless LAN access point function is referred to as a P2P group owner (hereinafter, "GO"), and the communication apparatus performing the wireless LAN station function is referred to as a P2P client (hereinafter, "CL"). If the communication apparatus is to act as the GO or the wireless LAN access point, a below-described wireless LAN access point function control unit 211 is started. If the communication apparatus is to act as the CL or the wireless LAN station, a below-described wireless LAN station function control unit 210 is started. The protocol of this GO Negotiation is determined based on the Wi-Fi Direct protocol specification. Since this is not a major point of the present invention, a description thereof will be omitted here. In Wi-Fi Direct, a network built by GO is referred to as a P2P group. In the present specification too, a network is also sometimes described as a P2P group. In the present exemplary embodiment, these terms are used with the same meaning. Further, in the present specification, the P2P group owner (GO), P2P client (CL), and a group of communication apparatuses whose roles have not yet been determined are collectively referred to as P2P devices.

A dynamic host configuration protocol (DHCP) client control unit 204 is started when the role of that communication apparatus is determined by the GO Negotiation control unit 203 to be as a wireless LAN station.

A DHCP server control unit 205 is started when the role of that communication apparatus is determined by the GO Negotiation control unit 203 to be as a wireless LAN access point.

A Wi-Fi protected setup (WPS) enrollee control unit 206 receives a communication parameter required for wireless LAN communication from another WPS registrar apparatus. Similar to the DHCP client control unit 204, the WPS enrollee control unit 206 is started when the role of that communication apparatus is determined to be as a wireless LAN station.

A WPS registrar control unit 207 provides a communication parameter required for wireless LAN communication to another WPS enrollee apparatus. Similar to the DHCP server control unit 205, the WPS registrar control unit 207 is started when the role of that communication apparatus is determined to be as a wireless LAN access point. Examples of the communication parameter provided by the WPS registrar include a service set identifier (SSID) as a network identifier, an encryption key, an encryption method, an authentication key, an authentication method, and the like.

A wireless LAN packet receiving unit 208 and a wireless LAN packet transmission unit 209 control the transmission and reception of all packets, including those for a higher layer transmission protocol.

The wireless LAN station function control unit 210 performs authentication and encryption processing when that apparatus operates as a wireless LAN station, and joins a wireless network built by an apparatus operating as a wireless LAN access point.

The wireless LAN access point function control unit 211 builds a wireless network when that apparatus operates as a wireless LAN access point, and performs authentication and encryption processing and manages communication apparatus counterparties, for example. The wireless LAN station function control unit 210 and the wireless LAN access point function control unit 211 can operate just either one of these functions or operate both of these functions simultaneously.

A packet routing control unit 212 performs bridging and routing communication packets when the wireless LAN access point function control unit 211 is operating.

A data storage unit 213 stores the software itself, wireless LAN parameters, and various tables such as a DHCP address table and Address Resolution Protocol (ARP) table.

A service discovery control unit 214 controls a service discovery function that is unique to Wi-Fi Direct. The service discovery function exchanges service information held by a communication counterparty apparatus by transmitting and receiving an action frame defined in IEEE 802.11u. Specifically, the service discovery control unit 214 transmits an SD query, and receives an SD response as a response. Alternatively, the service discovery control unit 214 receives an SD query from a counterparty apparatus, and transmits an SD response as a response. The SD response includes information indicating the type of service, specifically, a service such as a file transmitting service or a printing service.

A P2P invitation function control unit 215 controls an invitation function defined in the Wi-Fi Direct standard. Since this invitation function is defined in the Wi-Fi Direct standard, a description thereof will be omitted here, although it is a function that prompts a P2P device whose role as a GO device or as a CL device has not yet been determined to be connected as a P2P client.

A file transmitting service providing unit 216 provides a file transmitting service of an application layer. The term application layer refers to a service providing layer in the fifth layer or higher in the open systems interconnection (OSI) reference model. The file transmitting service transmits and receives various requests and responses utilizing a hypertext transfer protocol (HTTP), and performs file transmission and reception processing.

A file transmitting service utilization unit 217 in the application layer utilizes a service provided by the file transmitting service providing unit 216 of the application layer of the counterparty apparatus.

A session management unit 218 manages a logical connection in the file transmitting service. When utilizing the file transmitting service, a session generating request is transmitted to the counterparty communication apparatus by transmitting information about a file to be transmitted, and a response is received. When providing the file transmitting service, whether a session can be generated is determined based on the content of the received transmitting target file information, and a response is issued. The transmitting target file information is information formed from the number of files, the total size, and the file names. If it is determined that a session can be generated, the session management unit 218 performs connection processing based on a wireless layer. The exchange of information regarding session management is performed utilizing Public Action frame defined in IEEE 802.11.

Not all of the function blocks illustrated in FIG. 2 have to be provided by software, at least a portion of the function blocks may be provided by hardware. Further, the function blocks illustrated in FIG. 2 are interrelated with each other. Moreover, the respective function blocks illustrated in FIG. 2 are an example. A plurality of function blocks may configure one function block, or any of the function blocks may be divided into blocks performing a plurality of functions.

Further, in the present exemplary embodiment, the file transmitting service in the application layer is realized by an apparatus that provides that service and an apparatus that utilizes that service. The service providing apparatus and the service utilizing apparatus may be a smartphone, a tablet, a digital camera, or the like.

FIG. 3 illustrates a network A 31 (hereinafter, "network A") configured from a communication apparatus A 32 (hereinafter, "STA-A") and a communication apparatus B 33 (hereinafter, "STA-B"). All of these apparatuses have the configuration illustrated in the above-described FIGS. 1 and 2.

FIG. 4 is a schematic diagram illustrating an operation sequence between communication apparatuses STA-A and STA-B when the STA-A transmits an image file stored in the storage unit 103 to the STA-B.

In the example illustrated in FIG. 4, the STA-A is operating as a communication apparatus on the transmission side utilizing the file transmitting service, and the STA-B is operating as a communication apparatus on the receiving side providing the file transmitting service.

In step S401, the STA-A receives an instruction to start image transmitting mode according to a user operation. Then, in step S402, to utilize the file transmitting service, the STA-A transmits an inquiry signal for searching for the communication apparatus that is providing that service. In parallel with this process, the STA-A receives a user operation for selecting a file to be transmitted.

In step S403, the STA-B, which has received the inquiry signal, transmits a detection response signal to the STA-A.

In step S404, the STA-A, which has received the detection response, transmits a session generating request signal that includes transmitting target file information representing information about the file (transmission data) to be transmitted in order to establish a logical connection for the file transmitting service with the STA-B. Transmitting the transmitting target file information at this timing enables the STA-B to recognize in advance what kind of file will be transmitted. However, at this timing, the file to be transmitted may not yet be determined, or the file to be transmitted may change. Accordingly, at the STA-A according to the present exemplary embodiment, temporary file information is added as transmitting target file information to the session generating request signal to be transmitted in step S404. Since only temporary information is transmitted at this stage, this information does not have to match the file information that is actually transmitted. For example, the information may be "number of files: 1, total size: 5 MB, file name: 20130123113154.JPG". The values in this temporary file information may be transmitted as pre-stored fixed values, or as values that are different each time a session is generated.

In the present exemplary embodiment, the number of temporary file information files is set as 1. This allows the possibility of rejection of file transmission due to the temporary file information to be decreased even if, for example, the STA-B is an apparatus that does not accept the transmission of a predetermined number of files or more. Further, the total file size is set in units of from several megabytes to several tens of megabytes that the STA-B is capable of storing. Alternatively, a minimum settable value may be set. This allows the possibility of rejection of file transmission due to the temporary file information to be decreased even if, for example, the STA-B is an apparatus that does not accept the transmission of a file that is equal to or greater than a predetermined size or is equal to or greater than the available space on the STA-B. Further, a unique value that includes transmission date and time information is set in the file name. This is to reduce the possibility of the file to be accidentally a file with the same name if, for example, the STA-B is an apparatus that does not accept the transmission of files having the same name as a file that it has already received. This transmitting target file information is an example of transmission data-related information.

In step S405, the STA-B, which has received the session generating request signal, transmits a success response signal to the STA-A.

After the success response is received, in step S406, the STA-A performs wireless layer connection processing with the STA-B. Connection processing based on a wireless layer is connection processing that is based on the above-described Wi-Fi Direct specification. More specifically, either one of the STA-A and the STA-B becomes the P2P group owner (GO), and the other becomes the P2P client (CL). A connection is made by performing network joining processing, in which the CL joins a wireless network built by the GO.

After the wireless layer connection has been established, in step S407, the STA-A performs predetermined starting processing of the file transmitting service. Specifically, the STA-A performs setting processing of an Internet protocol (IP) address based on DHCP, and processing for acquiring from the STA-B the detailed information required for HTTP transmission in the file transmitting service.

Then, in step S408, the STA-A is notified by a user operation, for example, that selection of the file to be transmitted has been completed. At this point, the file information about the file to be transmitted is settled.

In step S409, the STA-A transmits the settled transmitting target file information to the STA-B, and issues a session changing request. The session changing request may be performed utilizing a Public Action frame defined in IEEE 802.11, or may be performed based on an HTTP protocol. In step S410, the STA-B, which has received the session changing request signal, transmits a success response signal to the STA-A. By performing the above processing, the temporary file information transmitted in step S404 can be corrected.

In step S411, the STA-A, which has received the success response, performs transmitting processing of the image file to the STA-B based on the transmitting target file information transmitted in step S409.

Then, in step S412, the STA-A receives a finishing instruction for the image transmitting mode by a user operation, for example, and in step S413, performs predetermined finishing processing of the file transmitting service. Specifically, the STA-A executes processing to delete the information generated in step S407 and releases a setting.

Next, in step S414, the STA-A transmits a session finishing request signal to finish the logical connection of the file transmitting service with the STA-B. In step S415, the STA-B, which has received the session finishing request signal, transmits a success response signal to the STA-A.

In step S416, the STA-A, which has received the success response signal, performs processing to disconnect the wireless layer connection with the STA-B. The wireless layer disconnection processing is disconnection processing based on the above-described Wi-Fi Direct specification.

FIG. 5 is a flowchart illustrating operation of a communication apparatus transmitting an image file stored in the storage unit 103 to a receiving device utilizing a file transmitting service. Each step in this flowchart is performed by the control unit 102 executing a program stored in the storage unit 103.

In step S501, the control unit 102 receives an instruction to start image transmitting mode via the operation unit 109. Then, in step S502, the control unit 102 displays a screen that allows the user to select the file to be transmitted, and performs file transmitting service search processing. The following steps S503 to S505 are performed in parallel with the processing in which the user selects the file to be transmitted via the selection screen.

In step S503, the control unit 102 performs a receiving device search determination. If a detection response from a receiving device is not received within a predetermined duration from the start of the search processing (NO in step S503), the control unit 102 notifies the user of that fact via the display unit 105, and finishes the transmitting mode.

If a receiving device is detected (YES in step S503), in step S504, the control unit 102 transmits the above-described temporary transmitting target file information to the receiving device, and performs session generation processing of a file transmitting service. If a plurality of receiving devices is detected, the control unit 102 may be configured so as to display the detected devices in a list, and receive a user operation for selecting the counterparty to transmit the file to.

After the session has been generated, in step S505, the control unit 102 performs wireless layer connection processing based on the Wi-Fi Direct specification with the receiving device. Then, the control unit 102 performs IP address setting processing based on DHCP, and acquisition processing of the detailed information required for HTTP transmission in the file transmitting service.

In step S506, the control unit 102 waits until selection by the user of the file to be transmitted is completed. When the file to be transmitted has been settled, and a transmit instruction issued (YES in step S506), in step S507, the control unit 102 transmits the settled transmitting target file information to the receiving device, and performs session information changing processing of the file transmitting service. Then, in step S508, based on the transmitting target file information transmitted in step S507, the control unit 102 performs transmitting processing of the file to the receiving device to which the data is actually to be transmitted. After file transmitting processing has been completed, the processing returns to a transmitting target file selection state in step S506. Then, if a selection operation of the file to be transmitted is performed again by the user (YES in step S506), the control unit 102 again executes the processing of steps S507 and S508.

If the control unit 102 receives a transmitting mode finishing instruction from the user while waiting for the transmitting target file selection to be completed in step S506 (YES in step S509), in step S510, the control unit 102 performs file transmitting service finishing processing and session finishing processing. In step S511, after the session has finished, the control unit 102 performs wireless layer disconnection processing.

FIGS. 6A and 6B are screens displayed on the display unit 105 of the communication apparatus utilizing the file transmitting service according to the present exemplary embodiment.

FIG. 6A illustrates the transmitting target file selection screen displayed in step S502. The screen includes a thumbnail 601 of an image file and a checkbox 602 indicating a selection. In FIG. 6A, image A, image B, and image E are selected. The screen illustrated in FIG. 6A also includes a transmission button 603. In a state in which a wireless layer connection has been established with a receiving device in step S506, when this transmission button 603 is pressed, step S507 is performed. If the transmission button 603 is pressed before a wireless layer connection has been established, the control unit 102 waits for a connection, and when a connection is made, performs step S507. When a stop button 604 is pressed, the transmitting mode is finished. At this point, the generated session and the wireless layer connection are released. An area 605 displays the connection status with the receiving device. At the step S502 stage, the area 605 shows "searching for receiving device".

FIG. 6B illustrates the transmitting target file selection screen that is displayed after step S505 has been executed. In step S505, since a connection based on a wireless layer is established with the receiving device, a connection status area 606 shows that the receiving device is "connected".

Thus, according to the present exemplary embodiment, when transmitting a stored image file to a receiving device, a selection operation by the user of the file to be transmitted can be executed in parallel with connection processing with the receiving device based on a wireless layer.

Further, in the present exemplary embodiment, after the transmitting mode has been started, although the selection operation of the file to be transmitted can be received before connection based on a wireless layer is performed, the processing can also be performed in such a manner that the screen illustrated in FIG. 6B is displayed after the connection based on a wireless layer is performed (step S505).

In the first exemplary embodiment, an example of performing a function has been described in which an image file stored in the storage unit 103 is transmitted to a receiving device utilizing the file transmitting service. In a second exemplary embodiment, an example of performing a function will be described in which a captured image is automatically transmitted to a receiving device utilizing the file transmitting service.

Since the present exemplary embodiment shares many parts that are common with the first exemplary embodiment, a description of the common parts will be omitted, and the description will mainly be focused on the parts that are specific to the present exemplary embodiment.

FIG. 7 is a schematic diagram illustrating an operation sequence between communication apparatuses STA-A and STA-B when the STA-A automatically transmits a captured image to the STA-B.

In FIG. 7, contents that are substantially the same as those in FIG. 4 according to the first exemplary embodiment will be provided with the same reference numerals, and descriptions thereof will not be repeated. The following description will mainly focus on the portions that feature the second exemplary embodiment.

After the file transmitting service starting processing has been performed in step S407, for example, in step S701, imaging processing is executed by the imaging unit 110 based on a user operation. Then, in step S409, information about the generated file is transmitted to the STA-B, and a session changing request is issued. Although it is assumed that the number of image files generated by the imaging will usually be one, in a case of continuous shooting, information about a plurality of captured image files may be collectively transmitted. Further, even when moving image recording is performed and the captured data is divided into a plurality of files, information about the plurality of captured image files may be collectively transmitted.

The series of processing steps (steps S701, S409, S410, and S411) from imaging execution to file transmitting processing may be repeated until image transmitting mode finishing processing in step S412 is performed. This allows the user to execute a plurality of imaging and transmitting operations while the file transmitting service session is still established.

FIG. 8 is a flowchart illustrating operation of a communication apparatus that automatically transmits a captured image to a receiving device utilizing a file transmitting service. Each step in this flowchart is performed by the control unit 102 executing a program stored in the storage unit 103.

In FIG. 8, processing that is substantially the same as that in FIG. 5 according to the first exemplary embodiment will be provided with the same reference numerals, and descriptions thereof will not be repeated. The following description will mainly focus on the parts that are feature the second exemplary embodiment.

In step S501, the control unit 102 receives an instruction to start image transmitting mode via the operation unit 109. Then, in step S801, the control unit 102 displays an imaging screen to the user, and performs file transmitting service search processing.

In step S802, the control unit 102 waits for imaging processing to be performed by the user. When an image has been generated by imaging processing and the file to be transmitted has been settled (YES in step S802), in step S507, the control unit 102 transmits the settled transmitting target file information to the receiving device, and performs session information changing processing of the file transmitting service. Then, in step S508, the control unit 102 performs transmitting processing of the file to the receiving device based on the transmitting target file information transmitted in step S507. After file transmitting processing has been completed, the processing returns to a transmitting target file selection state (step S802).

FIG. 9 illustrates a screen that is displayed on the display unit 105 in a communication apparatus utilizing the file transmitting service according to present exemplary embodiment.

In FIG. 9, components that are substantially the same those in FIG. 6 according to the first exemplary embodiment will be provided with the same reference numerals, and descriptions thereof will not be repeated. The following description will be made about the parts that feature the second exemplary embodiment.

FIG. 9 illustrates a imaging screen that is displayed in step S801.

The screen includes an area 901 that displays a through image of a camera, and an imaging button 902. In a state in which a wireless layer connection has been established with a receiving device (step S802), when this imaging button 902 is pressed, image data is generated by executing imaging processing, and step S507 is performed. If the imaging button 902 is pressed before a wireless layer connection has been established, the control unit 102 waits for a connection, and when a connection is made, performs step S507. When a stop button 903 is pressed, the transmitting mode is finished. At this stage, the generated session and the wireless layer connection are released.

Thus, according to the present exemplary embodiment, when transmitting a captured image to the receiving device simultaneously with capturing the image, the imaging operation by the user can be repeated while maintaining a connection based on a wireless layer with the receiving device.

Each of the above-described exemplary embodiments, which illustrate an example for carrying out the present invention, may be subjected to various modifications, as long as such modifications do not depart from the gist of the present invention. Further, the above-described first and second exemplary embodiments can be combined. In addition, whether the each of the communication apparatuses operates based on the first or the second exemplary embodiment may be arbitrarily selected by the user.

Although the above exemplary embodiments were described using a wireless LAN based on IEEE 802.11 as an example, the present invention may also be performed based on other types of wireless communication, such as wireless universal serial bus (USB), MultiBand OFDM Alliance (MBOA), Bluetooth (registered trade mark), ultra-wide band (UWB), and ZigBee (registered trade mark). Further, the present invention may also be performed in a wired communication medium, such as wired LAN. Further, UWB includes wireless USB, wireless 1394, WINET, and the like.

Aspects of the present invention can also be realized by a computer of a system or apparatus (or devices such as a CPU or MPU) that reads out and executes software (a program code) recorded on a memory device (computer-readable medium) to perform the functions of the above-described embodiments. In such a case, this program, and the storage medium where the program is stored, are included within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-033508, filed Feb. 22, 2013, which is hereby incorporated by reference herein in its entirety.

The invention claimed is:

1. A communication apparatus capable of transmitting data to an external device, comprising:
at least one processor;
a communication interface configured to communicate with the external device, at least one memory storing a program that, when executed by the at least one processor, causes the communication apparatus to perform a process, the process comprising:

transmitting, via the communication interface, to the external device using a predetermined protocol, first information as transmission data-related information relating to data to be transmitted to the external device, before joining a wireless network using the predetermined protocol, wherein the transmission data-related information is used by the external device to determine whether a transmission connection can be provided;

receiving, via the communication interface, a response from the external device using the predetermined protocol, after the transmission data-related information has been transmitted, the response indicating that the transmission connection can be provided;

after the response has been received joining a wireless network via the communication interface using the predetermined protocol; and after joining the wireless network, establishing a transmission connection with the external device for transmitting data to the external device using the predetermined protocol, wherein the first information is transmitted to the external device as the transmission data-related information, before the data to be transmitted to the external device is determined.

2. The communication apparatus according to claim 1, wherein the transmission data-related information is required for the communication apparatus to establish a transmission connection with the external device for transmitting data.

3. The communication apparatus according to claim 1, wherein the first information that is transmitted to the external device as the transmission data-related information is temporary information that is transmitted before the data to be transmitted to the external device is determined.

4. The communication apparatus according to claim 3, wherein the first information is information pre-stored in a storage in the communication apparatus.

5. The communication apparatus according to claim 1, wherein when the data to be transmitted to the external device has been determined, second information is transmitted to the external device as the transmission data-related information using the predetermined protocol, the second information based on the data determined to be the data to be transmitted to the external device.

6. The communication apparatus according to claim 5, wherein when transmitting the second information, the communication apparatus notifies the external device to change the first information using the predetermined protocol.

7. The communication apparatus according to claim 1, wherein determining the data to be transmitted to the external device occurs after the communication apparatus has joined the wireless network.

8. The communication apparatus according to claim 1, further comprising a data capturing unit, wherein second information based on captured data is transmitted to the external device as the transmission data-related information each time data is captured by the data capturing unit.

9. The communication apparatus according to claim 8, wherein the data capturing unit is an imaging unit.

10. A method for controlling a communication apparatus capable of transmitting data to an external device via a communication interface, the method comprising:

transmitting, via the communication interface, to the external device using a predetermined protocol, first information as transmission data-related information relating to data to be transmitted, before joining a wireless network using the predetermined protocol, wherein the transmission data-related information is used by the external device to determine whether a transmission connection can be provided;

receiving, via the communication interface, a response from the external device using the predetermined protocol, after the transmission data-related information has been transmitted, the response indicating that the transmission connection can be provided;

joining a wireless network via the communication interface using the predetermined protocol, after the response has been received; and after joining the wireless network, establishing a transmission connection with the external device for transmitting data to the external device using the predetermined protocol, wherein the first information is transmitted to the external device as the transmission data-related information, before the data to be transmitted to the external device is determined.

11. A non-transitory computer readable medium storing a program that causes a computer to execute a method for controlling a communication apparatus capable of transmitting data to an external device via a communication interface, the method comprising:

transmitting, via the communication interface, to the external device using a predetermined protocol, first information as transmission data-related information relating to data to be transmitted, before joining a wireless network using the predetermined protocol, wherein the transmission data-related information is used by the external device to determine whether a transmission connection can be provided;

receiving, via the communication interface, a response from the external device using the predetermined protocol, after the transmission data-related information has been transmitted, the response indicating that the transmission connection can be provided;

joining a wireless network via the communication interface using the predetermined protocol, after the response has been received; and after joining the wireless network, establishing a transmission connection with the external device for transmitting data to the external device using the predetermined protocol, wherein the first information is transmitted to the external device as the transmission data-related information, before the data to be transmitted to the external device is determined.

12. The communication apparatus according to claim 1, wherein the predetermined protocol is based on Wireless LAN.

13. The communication apparatus according to claim 1, wherein the predetermined protocol is based on IEEE 802.11 series.

* * * * *